United States Patent [19]

Nagaoka

[11] Patent Number: 5,328,966
[45] Date of Patent: Jul. 12, 1994

[54] CURABLE RESIN COMPOSITION

[75] Inventor: Hisayuki Nagaoka, Ohta, Japan

[73] Assignee: Toshiba Silicone Co., Ltd., Japan

[21] Appl. No.: 380,824

[22] Filed: Jul. 17, 1989

[30] Foreign Application Priority Data

Jul. 28, 1988 [JP] Japan .................. 63-188962

[51] Int. Cl.$^5$ ............... C08F 283/00; C08G 77/00; C08L 63/00
[52] U.S. Cl. ................... 525/476; 525/423; 525/510; 528/26; 528/27; 528/38; 528/93
[58] Field of Search .............. 525/423, 476, 510; 528/26, 27, 38, 93

[56] References Cited

U.S. PATENT DOCUMENTS

| Re. 32,958 | 6/1989 | Koshii et al. | 525/476 |
| 2,819,245 | 1/1958 | Shorr | 525/476 |
| 3,088,847 | 5/1963 | Pines | 525/476 |
| 4,584,342 | 4/1986 | Kondow | 525/476 |
| 4,668,754 | 5/1987 | Policastro et al. | 528/26 |
| 4,754,016 | 6/1988 | Aistal | 528/26 |

*Primary Examiner*—John C. Bleutge
*Assistant Examiner*—Randy Gulakowski

[57] ABSTRACT

Disclosed is a curable resin composition comprising (a) 100 parts by weight of a siloxane-amide block copolymer of formula (1):

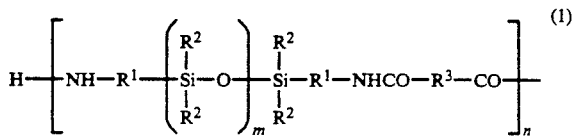

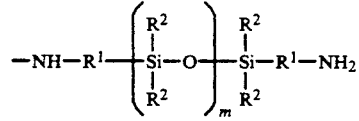

where $R^1$ is a substituted or unsubstituted divalent hydrocarbon group; $R^2$ may be the same or different and each is a substituted or unsubstituted monovalent hydrocarbon group; $R^3$ is substituted or unsubstituted divalent aromatic hydrocarbon group; and m and an each are a number of 1 or more; (b) from 1 to 100 parts by weight of a crosslinking agent containing 2 or more epoxy groups in the molecule, and (c) up to 15 parts by weight of a curable catalyst. The composition can be cured at room temperature and in the absence of moisture in a closed system to give a cured product having high oil resistance and mechanical strength.

3 Claims, No Drawings

CURABLE RESIN COMPOSITION

The present application claims the priority of Japanese Patent Application Serial No. 61-188962, filed on Jul. 28, 1988.

FIELD OF THE INVENTION

The present invention relates to a novel, curable resin composition containing a siloxane-amide block copolymer and an epoxy group-containing crosslinking agent. More precisely, it relates to said curable resin composition which can be cured even the absence of moisture by blending both components to give a cured product which has excellent oil resistance and high mechanical strength.

BACKGROUND OF THE INVENTION

As is well known, silicone polymers are different from other organic polymers and have particular characteristics. For instance, rubbers of silicone polymers are characterized in that they can maintain rubber elasticity for a long period of time even under a high temperature condition. They do not lose this rubber elasticity even when exposed to a low temperature condition of $-70°$ C. Additionally, temperature dependent fluctuation of the rubber property is small. In addition, they show stable electric characteristic values in a broad temperature range, and they have excellent arc resistance, corona resistance, and weather durability. Accordingly, even when they are exposed outdoors for a long period of time, or exposed to ultraviolet light, or exposed to ozone the rubber property thereof is not deteriorated. As silicone polymers have excellent characteristics as rubber elastic materials, as mentioned above, they have been put the practical use in various industrial fields and have been evaluated as indispensable and important materials therein.

However, silicone polymers are inferior to any other organic polymers in terms of mechanical strength. For instance, room temperature vulcanizing (hereinafter RTV) silicone rubber compositions are used in construction of outer walls of buildings, but they are not used as a structural material because of the weak rubber strength and are, therefore, exclusively used as a sealant material. Accordingly, silicone rubbers are not used as general resins or engineering plastics because of this poor mechanical strength. Such silicone rubbers, therefore, have a drawback in that they can be used only for limited, particular uses.

RTV silicone rubber compositions are used as a sealant of a non-shaped gasket for car engine parts because of the in-situ shapability thereof. In addition, for compositions are also significantly evaluated from the viewpoint of the excellent storage stability, operability, sealability, and heat resistance. However, they do not have sufficient oil resistance, and the cured product has been found to cause oil leakage when used in conjunction with gear oil containing a large amount of additives. Such oil leakage is a problem in this technical field.

The RTV silicone rubber compositions have the characteristic of changing into an elastomer upon contact with moisture at room temperature. However, as they are cured after being hydrolyzed with the moisture in air, they are required to be exposed to air so as to be cured. Accordingly, a long time is necessary before the composition is completely cured, and, if the composition is not exposed to air, no curing will take place. Thus, the composition still has such problems.

For such drawbacks of silicone rubbers, JP-A-59-80463 (the term "JP-A" as used herein means an "unexamined, published Japanese patent application") mentions a means of improving only the oil resistance of the materials, and JP-A-60-219284 mentions a means of improving the oil resistance of the materials and lowering the elasticity thereof. However, each of these are silent on the means of elevating the mechanical strength of the cured products as well as on the means of obtaining silicone rubber materials curable under moisture-free conditions.

SUMMARY OF THE INVENTION

The object of the present invention is to overcome the above-mentioned drawbacks of conventional RTV silicone rubber compositions and to provide a curable resin composition which can be cured in the absence of moisture to give a cured product having excellent oil resistance and high mechanical strength.

It has been discovered that a curable resin composition comprising a combination of a siloxane-amide block copolymer, as represented by formula (1) below, and an epoxy group-containing crosslinking agent is curable even in the absence of moisture by blending the components to give a cured product having excellent oil-resistance and high mechanical strength.

Thus, according to this invention, there is provided a curable resin composition comprising:

(a) 100 parts by weight of a siloxane-amide block copolymer represented be the general formula (1):

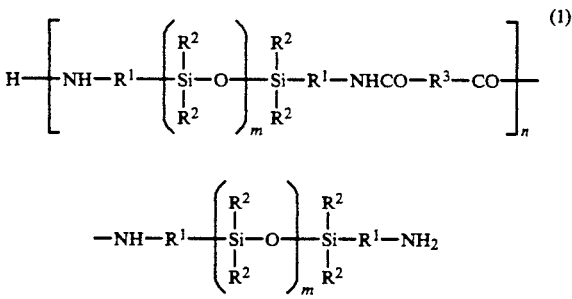
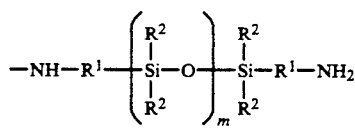

where $R^1$ represents a substituted or unsubstituted divalent hydrocarbon group; $R^2$ represents a substituted or unsubstituted monovalent hydrocarbon group; $R^3$ represents a substituted or unsubstituted divalent aromatic hydrocarbon group; and m and n each represent a number of 1 or more; and (b) from 1 to 100 parts by weight of a crosslinking agent containing 2 or more epoxy groups in the molecule; and (c) up to 10 parts by weight of a curable catalyst.

DETAILED DESCRIPTION OF THE INVENTION

The siloxane-amide block copolymer, component (a) of the present invention, which is represented be the aforementioned formula (1), can be prepared, for example, from a diaminosiloxane of formula (2), mentioned below, and a dicarboxylic acid dihalide of formula (3), also mentioned below:

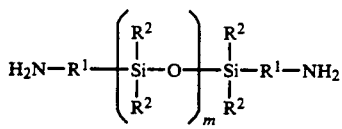  (2)

where $R^1$ represents a substituted or unsubstituted divalent hydrocarbon group; $R^2$ represents a substituted or unsubstituted monovalent hydrocarbon group; and m represents a number of 1 or more; and

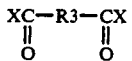  (3)

where $R^3$ represents a substituted or unsubstituted divalent aromatic hydrocarbon group; and X represents a halogen atom.

$R^1$ in the diaminosiloxane of formula (2) represents a substituted or unsubstituted divalent hydrocarbon group, which includes, for example, trimethylene, tetramethylene, pentamethylene, phenylene, tolyene, or dimethylphenylene. $R^2$ in the same formula (2) represents a substituted or unsubstituted monovalent hydrocarbon group and includes, for example, methyl, ethyl, propyl, butyl, pentyl, hexyl, phenyl, tolyl, xylyl, halophenyl, haoltolyl, cyanoethyl, or 3,3,3-trifluoropropyl. Specific examples of the diaminosiloxanes of formula (2), one or more of which are used in the present invention, are mentioned below:

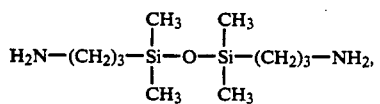

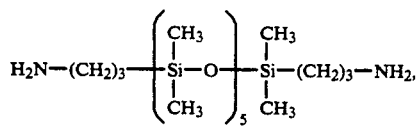

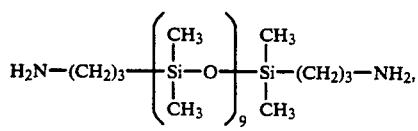

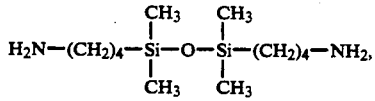

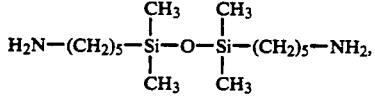

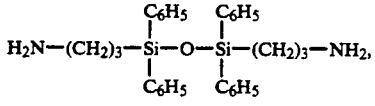

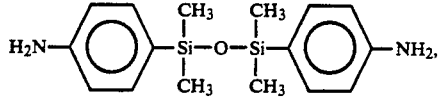

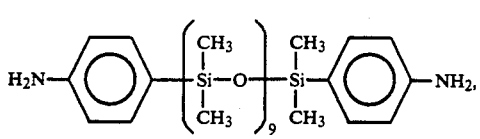

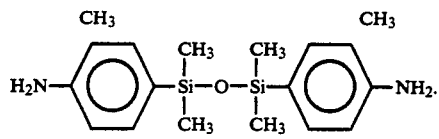

$R^3$ in the dicarboxylic acid dihalide of formula (3), which represents a substituted or unsubstituted divalent aromatic hydrocarbon group, includes, for example, phenylene, tolylene, dimethylphenylene, halogenated phenylene, napthalene, diphenylether, diphenylmethane, diphenylsulfone, or diphenylsulfide. X in the same formula (3) represents a halogen atom, which includes, for example, chlorine, fluorine, or bromine. Such dicarboxylic acid dihalides include, for example, dichloride, difluorides, or dibromides of terephthalic acid, isophthalic acid, 1,4-naphthalene-dicarboxylic acid, 1,5-naphthalene-dicarboxylic acid, 2,6-naphthalene-dicarboxylic acid, 4,4'-diphenylmethane-dicarboxylic acid, 3,3'-diphenylether-dicarboxylic acid, 3,3'-diphenylmethane-dicarboxylic acid, 4,4'-diphenylsulfide-dicarboxylic acid, or 3,3'-diphenylsulfide-dicarboxylic acid. One of them or a mixture thereof is used in the present invention.

For preparing the siloxane-amide block copolymer of the above-mentioned formula (1), the diaminosiloxane of formula (2) and the dicarboxylic acid dihalide of formula (3) are reacted by condensation, washed with water, and then dried.

The proportion of the diaminosiloxane to the dicarboxylic acid dihalide to be reacted in the above-mentioned reaction is not equimolar to each other. Rather, the former is required to be somewhat in excess over the latter in order that the copolymer (a) to be obtained therefrom may be cured in the presence of the crosslinking agent (b). For instance, the amount of the diaminosiloxane to be reacted with the dicarboxylic dihalide is from 1.005 to 2.0 mols, more preferably from 1.01 to 1.5 mols, per mol of the dicarboxylic dihalide. If the amount of the diaminosiloxane is less than 1.005 mols, both terminals of the resulting copolymer would not always be amino groups. On the other hand, if the amount of the diaminosiloxane is more than 2.0 mols, it will be difficult to achieve a molecular weight for the copolymer where good physical properties result.

The properties of the siloxane-amide block copolymer obtained by the method of the present invention will vary according to the kind of the diaminosiloxane used and the length of the siloxane unit, as well as the kind and amount of the dicarboxylic acid dihalide that is used.

It is contemplated that the siloxane-amide block copolymer of the present invention will have excellent workability as well as good mechanical strength and heat resistance.

The reaction conditions for preparing the siloxane-amide block copolymer for use in the present invention will be described in more detail. The polycondensation reaction temperature is within the range of from 10° C. to 100° C. An inorganic solvent or organic solvent and a base catalyst are preferably used so as to conduct the reaction with ease. Examples of inorganic solvents are aqueous solutions of sodium hydroxide and sodium carbonate.

Examples of effective organic solvents are toluene, xylene, chlorobenzene, dichlorobenzene, hexane, octane, diethyketone, dibutylketone, cyclohexanone, chloroform, 1,2-dichloroethane, 1,1,2,2-tetrachloroethane, N,N-dimethylformamide, N,N-dimethylacetamide, and N-methyl-2-pyrrolidone. These solvents may be used individually or in a mixture of two or more.

Effective catalysts are triethylamine and diisopropylmethylamine.

Component (b) in the present invention is effective for crosslinking component (a) to give a network structure thereto. It is preferably a crosslinking agent having two or more epoxy groups and is represented by the formula:

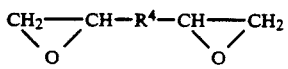

wherein $R^4$ is a substituted or unsubstituted divalent hydrocarbon group.

Typically $R^4$ includes an ether bond-containing alkylene group. Examples are shown as follows:

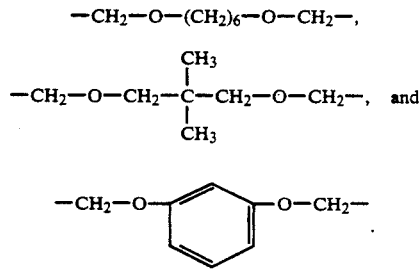

Specific examples of component (b) include 1,6-hexanediol diglycidylether, neopentylglycol diglycidylether, resorcinol diglycidylether, bisphenol-S diglycidylether, bisphenol-A diglycidylether, ethylenepolyethyleneglycol diglycidylether, propylene-polypropyleneglycol diglycidylether, polytetramethyleneglycol diglycidylether, diglycidyl adipate, diglycidyl phthalate, trimethylolpropane polyglycidylether, glycerol polyglycidylether, triglycidyl tris(2-hydroxyethyl)-isocyanuarate, sorbitol polyglycidylether, diglycerol polyglycidylether, polyglycerol polyglycidylether, and pentaerythritol polyglycidylether. It is contemplated that that component (b) may be any one individually or may be a mixture of any two or more.

The amount of the component (b) to be added is suitably from 1 to 100 parts by weight to 100 parts by weight of component (a). If it is less than 1 part by weight, component (a) would be insufficiently crosslinked resulting in poor physical properties in the cured product. On the other hand, if there is more than 100 parts by weight of component (b), either the heat resistance of the cured product would be insufficient or the excess component (b) would separate to form a surface layer part or island part in the cured product. If this latter phenomenon occurs the mechanical strength of the product would be unfavorably lowered.

The curing catalyst (c) for use in the present invention is one acting to react component (a) with component (b) at room temperature in an open atmosphere. It is represented by the general formula $R^5OH$, where $R^5$ is a monovalent substituted or unsubstituted hydrocarbon group. For instance, there are mentioned alcohols such as isopropanol, n-butanol, isobutanol, t-butanol, n-pentanol, and phenol.

The amount of catalyst (c) to be added is 15 parts or less by weight per 100 parts by weight of component (a). More preferably, it is added in an amount of from 1 to 10 parts by weight. If the amount of catalyst (c) exceeds 15 parts by weight, the reaction would be accelerated and the pot life shortened to such an extent that the mechanical strength and the heat resistance of the cured product would be unfavorably lowered. Also, when the components are blended under heat, catalyst (c) is unnecessary as the mixture of components (a) and (b) will rapidly cure in the absence of a catalyst.

In accordance with the present invention, filler and other additives can be added to the composition, provided that such additives do not interfere with the object of the present invention.

As the filler usable in the present invention, there is contemplated a reinforcing filler, a nonreinforcing extender, an electroconductive material, a heat releasing material, and a heat resistant material.

The composition of the invention may contain various additives such as an adhesive-improving agent, a pigment, a thixotropy-imparting agent, a viscosity-adjusting agent so as to improve the workability, an ultraviolet absorbent, a fungicide, a heat-resistance improving agent, and a flame-proofing agent.

The composition of the present invention can be prepared in the form of a two-package or multi-package type where all the above-mentioned components and various additives, if any, are properly stored in different containers and blended before use.

The curable resin composition of the present invention has excellent curing properties. It can be rapidly cured either at room temperature or under heat and can be cured in a system that is either open or closed to air (moisture). The resultant cured product has high mechanical strength and excellent oil resistance.

The composition of the present invention can be used not only in the field of conventional RTV silicone rubber compositions but also in any other field of general resins and engineering plastics.

The present invention will be explained in more detail by way of the following examples which are not intended to restrict the scope of the present invention. Unless otherwise specifically indicated, all "parts" in the following examples are "parts by weight."

EXAMPLE 1

One hundred (100) parts of diaminopropylsiloxane having the following formula:

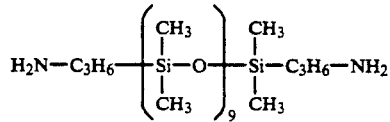

and 33.2 parts of triethylamine were added to 72.7 parts of dewatered xylene, stirred, and blended in nitrogen atmosphere. Next, 20.1 parts of terephthalic acid chloride was dissolved in 72.7 parts of dewatered xylene containing 2.0 parts of N-methyl-2-pyrrolidone, and the resulting solution was dropwise added to the previous mixture with stirring at room temperature. After completion of the addition, the whole was further stirred for 1 hour at room temperature and then for 8 hours at 80° C. to complete the polymerization. The polymer, which corresponds to component (a), thus obtained was washed with water several times and then dried under reduced pressure. The transparent, pale yellow product was confirmed to be siloxane-amide block copolymer from GPC, $^1$H-NMR spectrum and IR-absorption spectrum having a thermal decomposition temperature of 365° C. and having excellent heat resistance. It has the following formula:

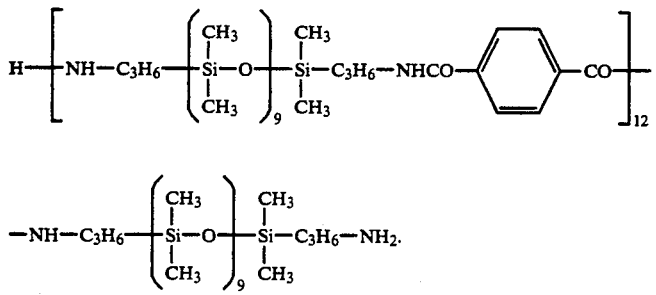

EXAMPLE 2

To 50.0 parts of the siloxane-amide block copolymer obtained in the previous Example 1 were added 2.72 parts of 4,4'-dioxydiphenyl-2,2-propane diglycidylether and 0.14 part of phenol at 20° C. and blended to obtain a uniform blend, which was then defoamed to obtain a composition. This was divided into two equal parts, and each was shaped into a 2 mm thick sheet. One sheet was cured under open conditions at a temperature of 20° C. and a relative humidity of 55%. The other sheet was cured under closed conditions at a temperature of 20° C. Thus two cured products were obtained. After being left as they were for 7 days, the sheets were subjected to a test of JIS K 6301 (for testing physical properties of vulcanized rubber products) where the hardness, tensile strength and oil resistance of the cured products were determined. The results are shown in Table 1 below. As is obvious therefrom, the composition could be cured even in a closed system where air (moisture) was shut out and the cured product had high tensile strength and good oil resistance.

TABLE 1

| Curing Condition | Hardness | Tensile Strength | Oil Resistance (JIS No. 3 Oil) 150° C., 3 days |
|---|---|---|---|
| 20° C., 55% RH, 7 days | 68 | 48 Kgf/cm$^2$ | +4.0 vol. % |
| 20° C., closed system 7 days | 68 | 47 kgf/cm$^2$ | +4.0 vol. % |

EXAMPLE 3

To 50.0 parts of the siloxane-amide block copolymer obtained in Example 1 were added 1.73 parts of neopentylglycol diglycidylether and 0.09 part of pentanol at 20° C. The mixture was blended to obtain a uniform blend and defoamed. The resulting composition was divided into two equal parts, and each part was shaped into a 2 mm thick sheet. The sheets were cured under the same conditions as those in Example 2, and the hardness, tensile strength and oil resistance of the cured products were determined in the same manner as in Example 2. The results obtained are shown in Table 2, below. As is obvious therefrom, the composition could be cured even in a closed system where air (moisture) was shut out and the cured product had a high tensile strength and good oil resistance.

TABLE 2

| Curing Condition | Hardness | Tensile Strength | Oil Resistance (JIS No. 3 Oil) 150° C., 3 days |
|---|---|---|---|
| 20° C., 55% RH, 7 days | 74 | 55 Kgf/cm$^2$ | +3.5 vol. % |
| 20° C., closed system 7 days | 74 | 56 kgf/cm$^2$ | +4.0 vol. % |

EXAMPLE 4

Fifty (50.0) parts of diaminopropylsiloxane having the following formula:

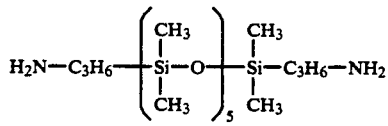

and 27.9 parts of triethylamine and 3.5 parts of N-methyl-2-pyrrolidone were added to 47.5 parts of dewatered xylene, stirred and blended in nitrogen atmosphere. Next, 17.0 parts of isophthalic acid chloride was dissolved in 47.5 parts of dewatered xylene containing 3.5 parts of N-methyl-2-pyrrolidone, and the resulting solution was dropwise added to the previous mixture with stirring at room temperature. After completion of the addition, the whole was further stirred for 1 hour at room temperature and then for 8 hours at 80° C. to complete the polymerization. The polymer thus obtained was washed with water several times and then dried under reduced pressure. The product, which corresponds to component (a) of the present invention, was a reddish yellow, transparent resinous product and was confirmed to be siloxane-amide block copolymer from GPC, $^1$H-NMR spectrum and IR absorption spectrum having a thermal decomposition temperature of 370° C. and excellent heat resistance. This product has the following formula:

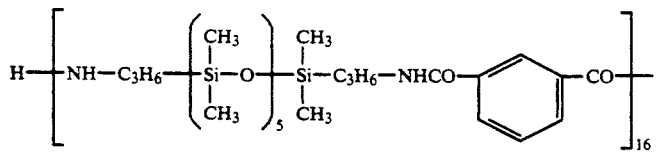

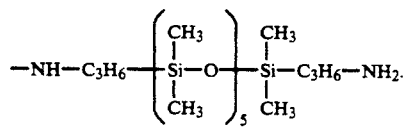

EXAMPLE 5

To 40.0 parts of the siloxane-amide block copolymer obtained in the previous Example 4 were added 40.0 parts of α,ω-polydimethylsiloxanediol, having a viscosity of 3000 cst at 25° C., and 20.0 parts of dimethylformamide at 80° C. and blended to obtain a uniform blend. The composition was then cooled to obtain a base polymer. To 50.0 parts of the base polymer were added 0.93 part of 1,6-hexanediol diglycidylether and 0.01 part of isopropyl alcohol, and the whole was blended to obtain a uniform blend. This was then defoamed to obtain a composition. This composition was then divided into two parts, and each part was shaped into a 2 mm thick sheet. The sheets were cured under the same conditions as those in Example 2, and the hardness, tensile strength and oil resistance of the cured products were determined in the same manner as in Example 2. The results obtained are shown in Table 3 below. As is obvious therefrom, the composition could be cured even in a closed system where air (moisture) was shut out. The cured product had high tensile strength and good oil resistance.

TABLE 3

| Curing Condition | Hardness | Tensile Strength | Oil Resistance (JIS No. 3 Oil) 150° C., 3 days |
|---|---|---|---|
| 20° C., 55% RH, 7 days | 89 | 76 Kgf/cm$^2$ | +3.5 vol. % |
| 20° C., closed system 7 days | 90 | 77 kgf/cm$^2$ | +3.5 vol. % |

EXAMPLE 6

To 50.0 parts of the base polymer obtained in the previous Example 5 was added 1.00 part of trimethylolpropane diglycidylether at 20° C. and blended to obtain a uniform blend, which was then defoamed to obtain a composition. This composition was then divided into two parts, and each was shaped into a 2 mm thick sheet. One sheet was heated in an open system at 100° C. and 55% RH for 1 hour, and the other sheet was heated in a closed system (air shut out) at 100° C. for 1 hour. Accordingly, two cured products were obtained. They were subjected to a test of JIS 6301 (for testing physical property of vulcanized rubber products) and the hardness, tensile strength and oil resistance of the cured products were determined. The results obtained are shown in Table 4 below. As is obvious therefrom, the composition could be cured even in a closed system under heat where air (moisture) was shut out, and the cured product had high tensile strength and good oil resistance.

TABLE 4

| Curing Condition | Hardness | Tensile Strength | Oil Resistance (JIS No. 3 Oil) 150° C., 3 days |
|---|---|---|---|
| 100° C., 55% RH, 1 hour | 91 | 103 Kgf/cm$^2$ | +3.5 vol. % |
| 100° C., closed system 1 hour | 92 | 105 kgf/cm$^2$ | +3.5 vol. % |

While the invention has been described in detail and with reference to specific embodiments thereof, it will be apparent to one skilled in the art that various changes and modifications can be made therein without departing from the spirit and scope thereof.

What is claimed is:

1. A curable resin composition comprising:
   (a) 100 parts by weight of a siloxane-amide block copolymer represented by the formula:

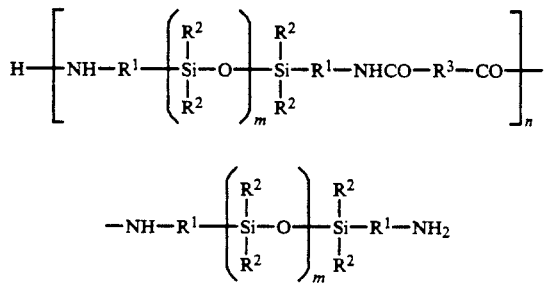

where $R^1$ represents a substituted or unsubstituted divalent hydrocarbon group; each $R^2$ may be the same or different substituted or unsubstituted monovalent hydrocarbon group; $R^3$ represents a substituted or unsubstituted divalent aromatic hydrocarbon group; and m and n each represent a number of 1 or more;

(b) from 1 to 100 parts by weight of a crosslinking agent containing 2 or more epoxy groups; and
   (c) up to 15 parts by weight of a curing catalyst.

2. The curable resin composition as claimed in claim 1, in which the component (b) is a compound of the formula:

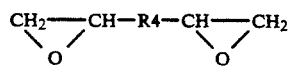

where $R^4$ represents a substituted or unsubstituted divalent hydrocarbon group.

3. The curable resin composition as claimed in claim 1, in which the component (c) is a compound of the formula:

$R^5OH$ where $R^5$ represents a substituted or unsubstituted monovalent hydrocarbon group.

* * * * *